US008635043B1

(12) United States Patent
Olsson et al.

(10) Patent No.: US 8,635,043 B1
(45) Date of Patent: Jan. 21, 2014

(54) LOCATOR AND TRANSMITTER CALIBRATION SYSTEM

(75) Inventors: Mark S. Olsson, La Jolla, CA (US); Michael J. Martin, San Diego, CA (US); Anthony L. Coduti, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 646 days.

(21) Appl. No.: 12/826,427

(22) Filed: Jun. 29, 2010

Related U.S. Application Data

(60) Continuation of application No. 12/103,971, filed on Apr. 16, 2008, now abandoned, and a continuation-in-part of application No. 12/780,311, filed on May 14, 2010, now Pat. No. 8,106,660, which is a division of application No. 12/243,191, filed on Oct. 1, 2008, now Pat. No. 7,733,077, which is a continuation of application No. 11/970,818, filed on Jan. 8, 2008, now Pat. No. 7,443,154, which is a division of application No. 10/956,328, filed on Oct. 1, 2004, now Pat. No. 7,336,078.

(60) Provisional application No. 60/912,517, filed on Apr. 18, 2007, provisional application No. 60/508,723, filed on Oct. 4, 2003.

(51) Int. Cl.
*G01C 19/00* (2013.01)

(52) U.S. Cl.
USPC ............................................................ 702/104

(58) Field of Classification Search
USPC ........................................................... 702/104
See application file for complete search history.

(56) References Cited

U.S. PATENT DOCUMENTS

| | | | |
|---|---|---|---|
| 4,328,552 A | 5/1982 | Stovall | 364/554 |
| 5,155,442 A | 10/1992 | Mercer | 324/690 |
| 5,337,002 A | 8/1994 | Mercer | 324/326 |
| 5,640,092 A | 6/1997 | Motazed et al. | 324/326 |
| 6,084,545 A | 7/2000 | Lier et al. | 342/360 |
| 6,581,480 B1 | 6/2003 | May et al. | 73/862.333 |
| 7,133,793 B2 | 11/2006 | Ely et al. | 702/104 |
| 7,154,267 B2 | 12/2006 | Withanawasam | 324/244 |
| 7,230,980 B2 | 6/2007 | Langford et al. | 375/219 |
| 7,336,078 B1 | 2/2008 | Merewether et al. | 324/326 |
| 8,248,056 B1 * | 8/2012 | Olsson et al. | 324/67 |
| 2004/0070399 A1 * | 4/2004 | Olsson et al. | 324/326 |
| 2009/0256751 A1 | 10/2009 | Zeller et al. | 342/463 |
| 2009/0273339 A1 | 11/2009 | Branson | 324/202 |

* cited by examiner

*Primary Examiner* — Aditya Bhat
(74) *Attorney, Agent, or Firm* — Steven C. Tietsworth, Esq.

(57) ABSTRACT

A framework encloses a stepper motor, mounting structure, and circuitry for use in calibrating the responses of utility locators or the precise frequency outputs of locating transmitters, and associated tilt, directional, angle, and gradient sensors. The framework contains two Helmholtz or similar field windings embedded in its sides to achieve maximum accuracy in calibration of locating instruments, such that a locator may be precisely situated within the uniform field of the windings for calibration measurement or testing. Calibration and testing may be done manually or by automated means.

20 Claims, 10 Drawing Sheets

US 8,635,043 B1

LOCATOR AND TRANSMITTER CALIBRATION SYSTEM

CROSS-REFERENCE TO RELATED APPLICATION

This application claims the benefit of the filing date of the similarly entitled U.S. Provisional Patent Application Ser. No. 60/912,517 filed Apr. 18, 2007, of Mark S. Olsson et al., the entire disclosure of which is hereby incorporated by reference. This application is a continuation of co-pending U.S. patent application Ser. No. 12/103,971 filed Apr. 16, 2008, and is also a continuation-in-part of co-pending U.S. patent application Ser. No. 12/780,311 filed May 14, 2010, which was a division of U.S. patent application Ser. No. 12/243,191 filed Oct. 1, 2008, now U.S. Pat. No. 7,733,077, which was a continuation of U.S. patent application Ser. No. 11/970,818 filed Jan. 8, 2008, now U.S. Pat. No. 7,443,154, which was a division of U.S. patent application Ser. No. 10/956,328 filed Oct. 1, 2004, now U.S. Pat. No. 7,336,078, which in turn claimed benefit of U.S. Provisional Patent Application Ser. No. 60/508,723 filed Oct. 4, 2003.

FIELD OF THE INVENTION

The present invention relates to the technology of underground utility locating receivers and transmitters, and specifically to apparatus for calibrating such instruments for dependable field use.

BACKGROUND

For many years, utility locating receivers have been used to identify the location of buried pipes and cables underground. These receivers typically detect fields which are imposed onto pipes and cables using a dedicated transmitter at defined frequencies, by induction or direct connection. Locating receivers may also scan for passive signals generated in underground conductors by other sources than a locating transmitter, such as ambient broadcast energy, electrical current from generating plants, etc. The majority of locating instruments use electro-mechanical elements in their circuits, such as potentiometers, for example, which over time may shift out of calibration causing inaccuracies to creep into the locating process. More modern locating instruments may be tuned and calibrated through software only, but even these must be initially calibrated for accuracy in application and their calibration verified at intervals. Because of the potential cost and potential damage that may be incurred through inaccurate locating, precise calibration is critically important both in the manufacture of locating instruments and in their continued field use.

SUMMARY OF THE INVENTION

The present invention provides an improved system for achieving calibration of a locating receiver or a locating transmitter, or similar device, a system for data capture and storage in the calibrating process, and a system for minimizing distortion in the calibrating process that could be caused by uncontrolled environmental electromagnetic perturbations. It provides as well a system for calibrating the depth detection of a locating instrument and calibrating a locator with an embedded compass. The present invention also provides a system that performs a quick check on depth, signal strength, angle balance, alignment, and operation of gradient coils in a single manual operation.

One aspect of the preferred embodiment of this invention is the capability of centrally positioning an omnidirectional locator which uses gradient coil antennas in a controlled symmetrical field in order to calibrate the gradient coils.

Another aspect of the present invention is the rotation of a locator within a symmetrical and controlled electromagnetic field established by the Helmholtz windings, as a way of testing or calibrating the detections of the locator and the omnidirectional symmetry of the antenna nodes.

Another aspect of the present invention is the ability to control such a rotational process automatically from an associated computer which sends control signals to a rotary drive motor which controls the rotational motion of the locator during testing.

Another aspect of the present invention allows the rotary calibration to be performed without automation by a manual operator reading the locator screen in order to do a rapid field check and calibration of the locator.

Another aspect of the present invention is the ability to rigidly situate a locator along a vertical line perpendicular to the horizontal 4-fold symmetry axis of the field in such a way that it is slightly above the center of the field, with the result that the upper antenna node receives a lower signal strength than the lower antenna node. When this occurs under controlled conditions, with known values of distance, it enables an operator to calibrate the depth-reading capability of the locator based on the differences between the signal strengths received at the upper and lower antenna nodes.

DETAILED DESCRIPTION

Figure 1A:
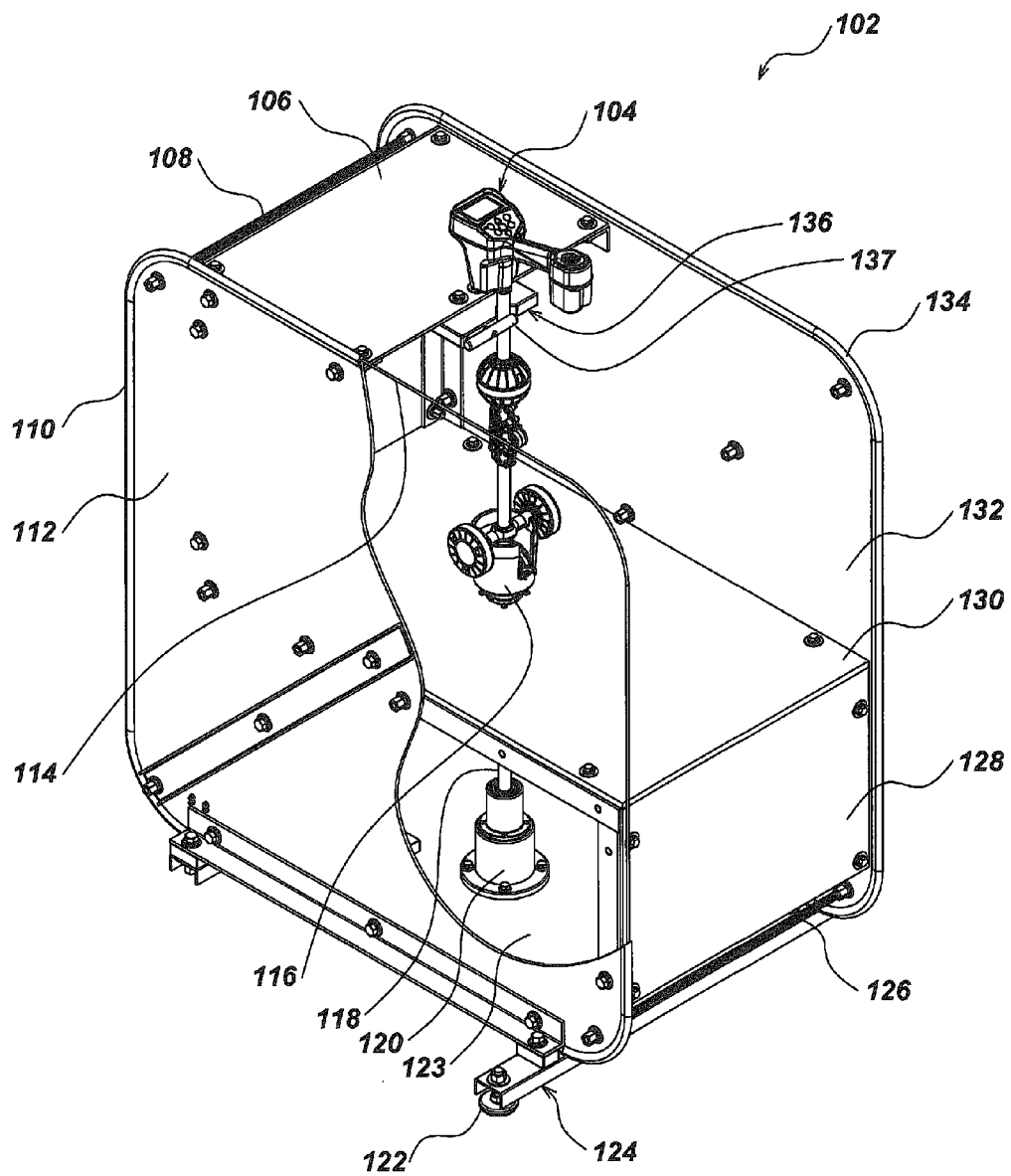
FIG. 1A is a perspective cutaway view of an embodiment of the present invention.

Referring to FIG. 1A, a calibration system 102 comprises a rigid calibrator frame or assembly including two side panels 112, 132 around each of which are wound the windings (e.g., 114) of the Helmholtz coil (one shown) covered by protective bumpers 110, 134. A single turn of copper tape is used for each winding in this preferred embodiment. The calibrator assembly itself comprises side panels 112, 132, a platform 130, a front lower panel 128, a lower floor 123, and top panel 106. The panels assembled on a frame 124 of joined members with three height-adjustable foot pads for leveling the system. (Only foot pad 122 is shown in this view.) The calibrator assembly is strengthened and given additional rigidity by a number of threaded stiffening rods 108 and 126, which hold opposing sides together. Panels, threaded rods, nuts, and bolts are non-magnetic and electrically insulating fiber reinforced plastics. Suitable fibers are glass and Kevlar. Suitable plastics are rigid epoxies, polyesters, and urethanes.

The top panel 106 is fitted with a support in the form of an upper clamp assembly 136 into which the vertical shaft of a portable locator 104 may be secured above a platform 130. The clamp assembly 136 includes a pivoting locking member 137.

By way of example, the locator 104 may be of the type disclosed in U.S. Pat. No. 7,009,399 granted Mar. 7, 2006, for example, the entire disclosure of which is hereby incorporated by reference. The clamp assembly 136 includes a pivoting locking member 137. The locator support further includes a cup-like locator mount 116 that is fitted to the top end of shaft 118, into which mount the lower antenna node of the locator may be seated. Locator mount 116 is formed to accommodate the lower antenna node typical of omnidirectional antenna locators. The locator mount 116 is vertically adjustable by means of a threaded shaft fitted to a collar (not illustrated in this figure). In an alternative embodiment, the locator mount 116 may be configured to adjustably accept various locators of different form-factors. The locator mount 116 is coupled by a shaft 118 which passes through a hole in the platform 130, and which in turn is coupled through a housing 120 to a drive motor and rotary encoder assembly (not illustrated in this figure) mounted on the calibrator assembly flooring 123 beneath the platform 130.

Figure 1B:
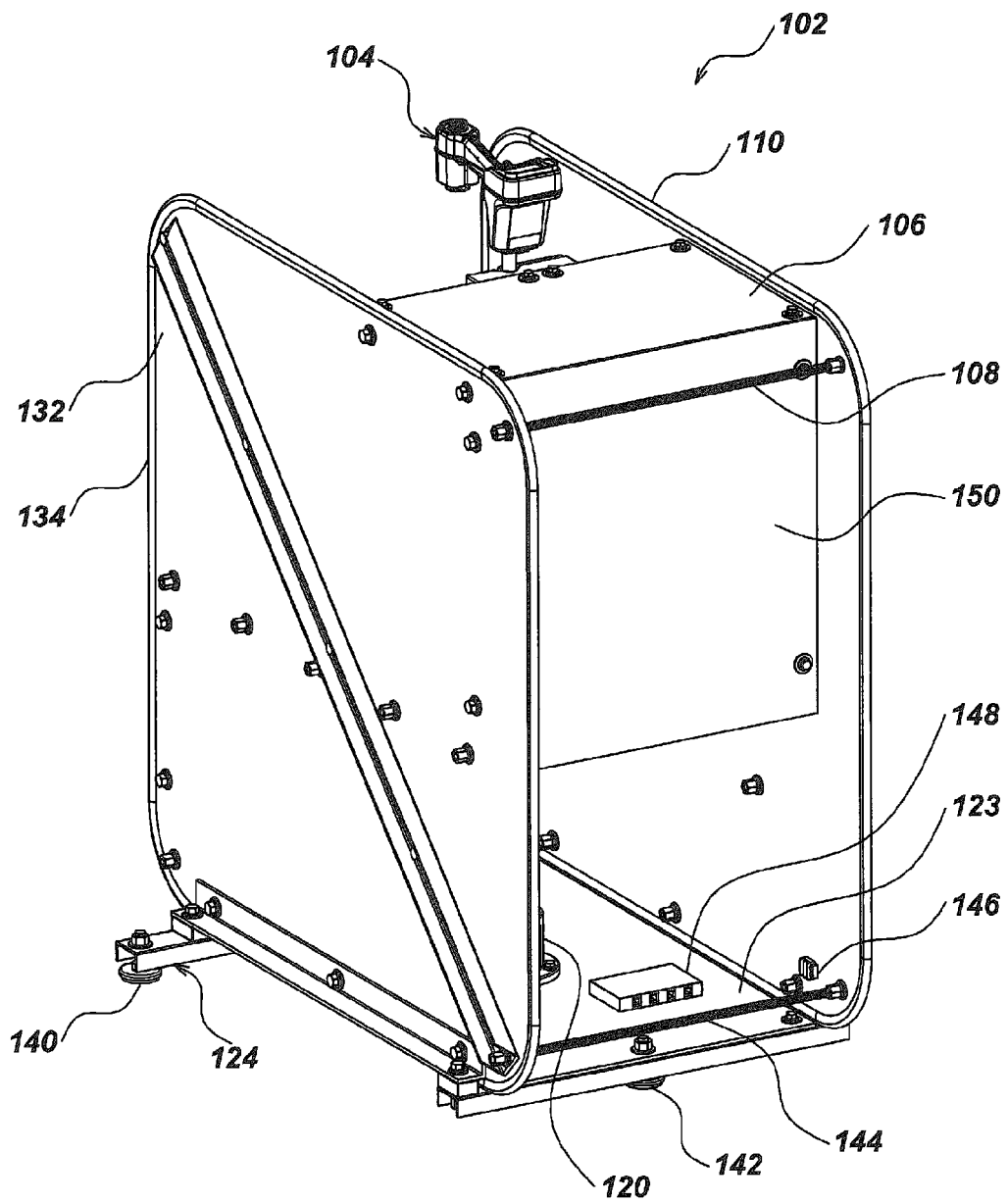
FIG. 1B is a perspective rear view of the system of FIG. 1A.

Turning to FIG. 1B, the circuit formed by the Helmholtz coil windings (wound under the bumpers 134 and 110) terminates in attachment posts, such as 146, to which the standard clips of a locating transmitter may be easily connected. A suitable transmitter is disclosed in published U.S. Patent Application US-2005-0156600-A1 published Jul. 21, 2005, the entire disclosure of which is hereby incorporated by reference. A cable plug and jack may also be used for the same purpose, rather than individual clips and posts. A specially calibrated transmitter or signal generator may be used to drive this circuit at a selected frequency, thus establishing a uniform and standardized magnetic field around and through the locator at the same frequency. A similar configuration using a calibrated locator may be used to test or calibrate a transmitter's output at various frequency settings.

The housing 120 encloses the drive motor and rotary encoder assembly (not illustrated in FIG. 1B) which is connected to an interface 148 such as a USB hub, for example, to which a computer may be connected. The computer, which may be a laptop personal computer, for example, can be used to send drive commands to the rotary motor, causing the shaft 118, locator mount 116 and thus the locator 104 to rotate on command at a selected rate. The process may be automated by computer or it may be done manually. In the process of manually or automatically rotating the locator 104 when the Helmholtz coil windings are excited at a selected frequency, an operator may capture the responses of the locator 104 and compare them to specification values as a means of calibration or of testing the locator 104. Angle values read from the rotary encoder assembly are returned to the coupled computer through the same USB hub 148. Signal strength readings from the locator 104 are transmitted through the same USB hub 148 on a separate channel. The locator 104 is connected to the USB hub 148 via flexible cable or a radio link such as Bluetooth. Infrared data links may also be used. When a transmitter is equipped to be controlled remotely it may similarly be connected through the USB hub 148, and control signals transmitted from the computer to adjust frequency and power settings or signal generator.

Figure 1C:
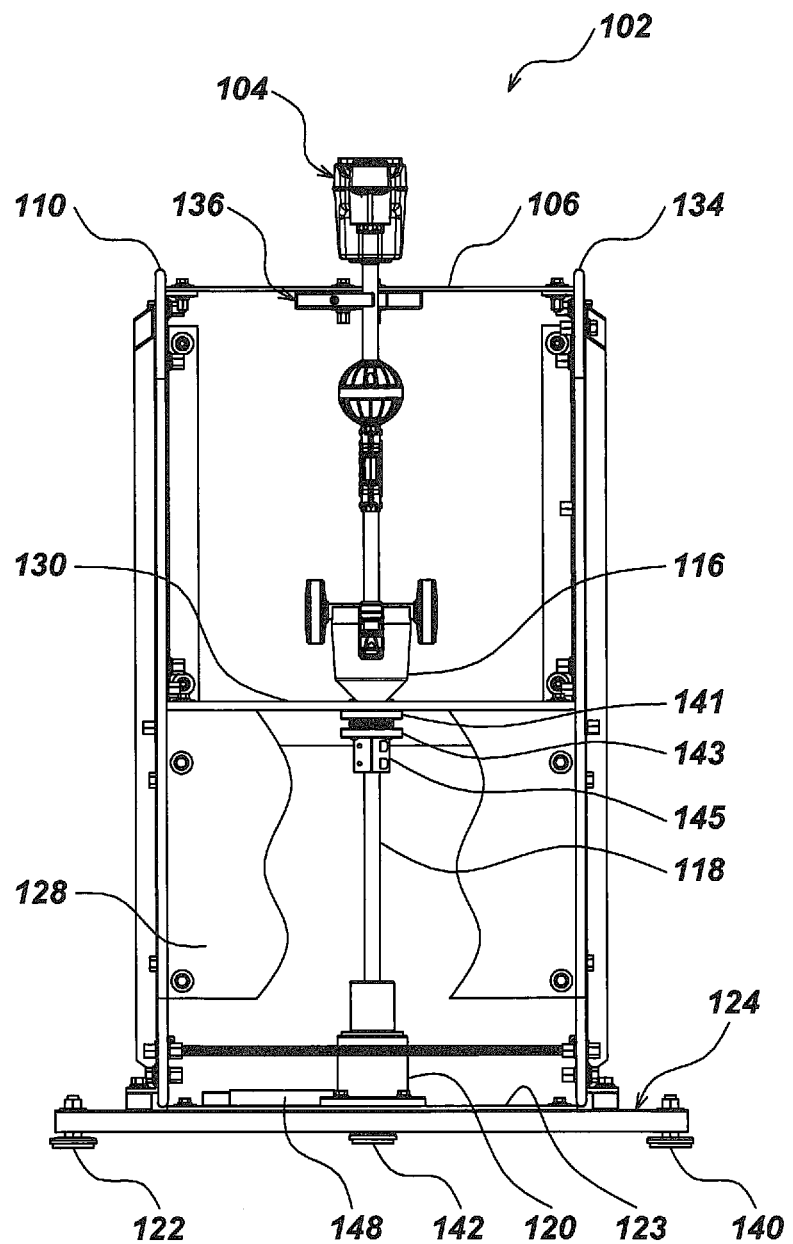
FIG. 1C is a front elevation view of the system of FIG. 1A.

As illustrated in FIG. 1C, the locator 104 is secured in clamp assembly 136 and seated in locator mount 116 on shaft 118. The locator mount 116 is connected by shaft 118 to the drive motor and rotary encoder assembly which is protected by a housing 120. The locator mount 116 is supported by a bearing inside adjustable sleeve 143. Adjustable sleeve 143 threads into coupling ring 141. Coupling ring 141 is rigidly mounted to upper platform 130. Rotating adjustable sleeve 143 vertically raises or lowers the locator mount 116. A mounting collar 145 acts to retain the shaft 118 when the locator mount 116 is removed. The front lower panel 128 (partially illustrated) and floor platform 123, on which the USB hub 148 is situated, are visible in FIG. 1C. Leveling adjustable foot pieces 122, 142, 140 are used to establish the system on a level plane. The protective bumpers 110, 134 on the Helmholtz windings used in this embodiment are visible in FIG. 1C. Holding the locator 104 precisely vertical allows partial accelerometer calibration and 2-D compass calibration to also be performed.

Figure 1D:
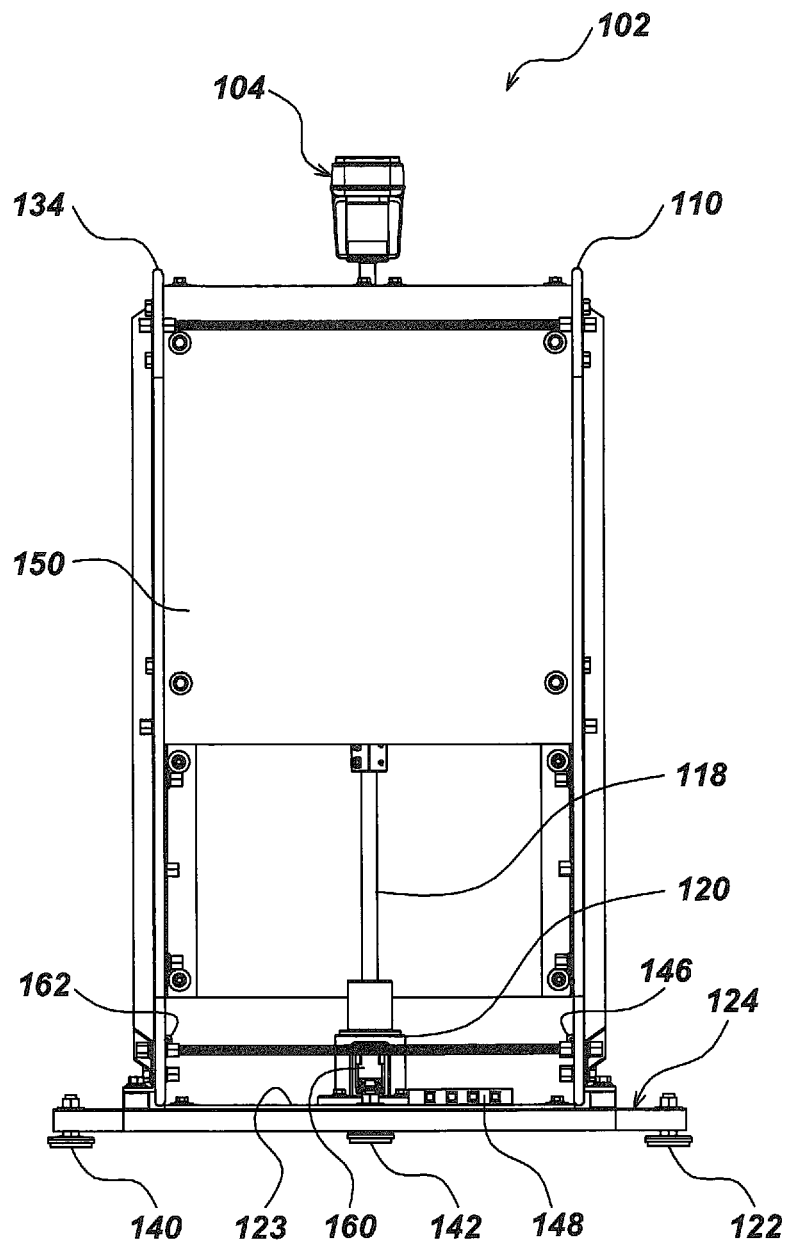
FIG. 1D is a rear elevation view of the system of FIG. 1A.

In FIG. 1D, the locator 104, Helmholtz coil bumper covers 134, 110, and rear panel 150 can be seen. The shaft 118 connecting the locator mount (FIG. 1B, 116) to the drive motor and rotary encoder assembly 160 is visible. The removable outer housing 120 is cut-away, revealing the drive motor and rotary encoder assembly 160 within. The USB hub 148 provides connection means for angle data from the drive motor and rotary encoder assembly 160, control data for the drive motor and rotary encoder assembly 160, signal strength information from locator 104, transmitter data and control, compass, temperature, tilt, and other data to be exchanged with a computer depending on the configuration of the system components.

Figure 1E:
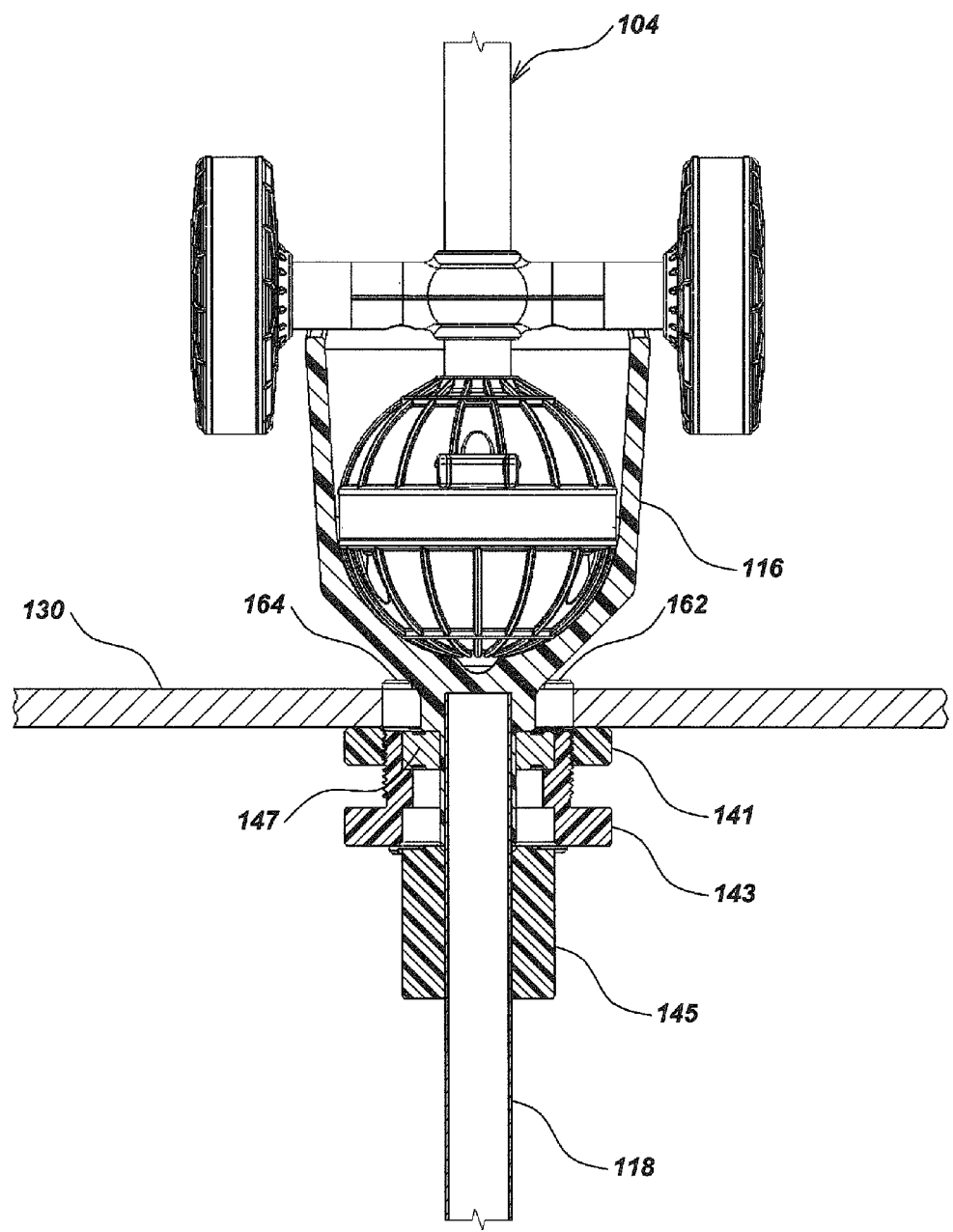
FIG. 1E is an enlarged section view of an adjustment collar by which the vertical location of the antenna nodes relative to the generated field may be controlled.

FIG. 1E illustrates a closer view of the vertical adjustment mechanism in the locator mount 116 which holds the lower end of the locator 104. In FIG. 1E, the locator 104 is seated in a locator mount 116 of cup-like form, which may be notched or slotted to accept protrusions in the appropriate antenna node or its connecting shaft. Shaft 118 connects the locator mount with the drive motor and rotary encoder (not illustrated). Platform 130 supports internally-threaded coupler 141. Internally-threaded coupler 141 in turn supports an externally-threaded adjustable sleeve 143 which encloses a bearing 147. In use, the adjustable sleeve 143 may be rotated to raise or lower bearing 147 and the locator mount 116 relative to the symmetrical field generated by means of the Helmholtz coil (114 in FIG. 1A), such as when calibrating or testing depth measurement. Non-magnetic and non-metallic parts are used whenever possible throughout. Screws 162, 164 secure the platform 130 to the coupler 141.

Figure 1F:
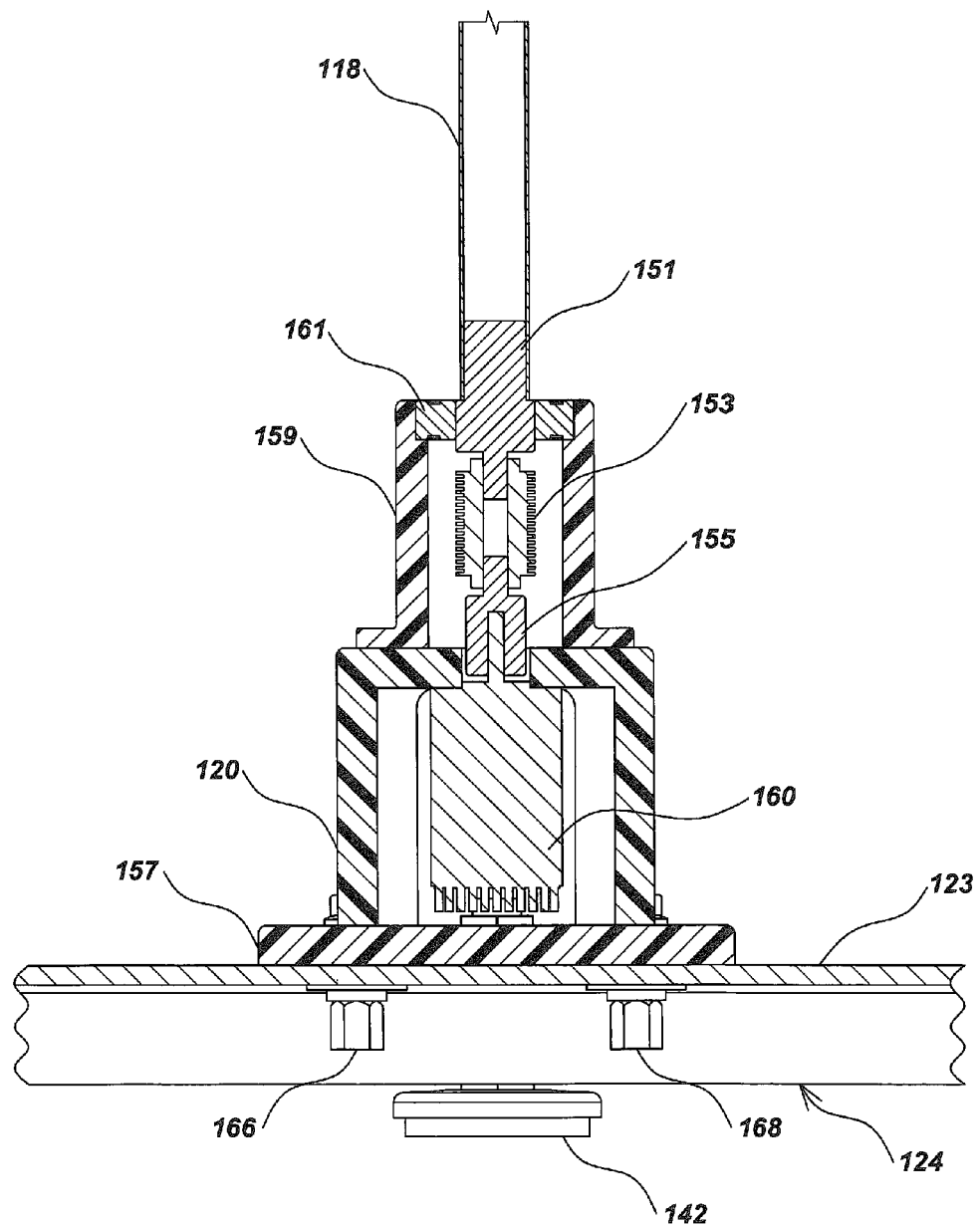
FIG. 1F is an enlarged section view of a drive motor and rotary coupler assembly.

FIG. 1F illustrates a sectional view of the drive motor and rotary couplers used in the rotation of the locator within the symmetrical field generated by means of the Helmholtz coils. In FIG. 1F, shaft 118 is connected to the drive motor and rotary encoder assembly 160 by means of a shaft drive coupling adaptor 151 supported by a bearing 161 and joined to a high-precision bellows shaft coupling 153. A motor-drive couple adaptor 155 connects the bellows coupling 153 to the drive motor and rotary encoder assembly 160. The base plate 157 of the housing 120 is attached to the floor plate 123 by through-bolts 166, 168. The system frame 124 and one of the footpads 142 are shown supporting the floor plate 123 in FIG. 1F.

Figure 2:
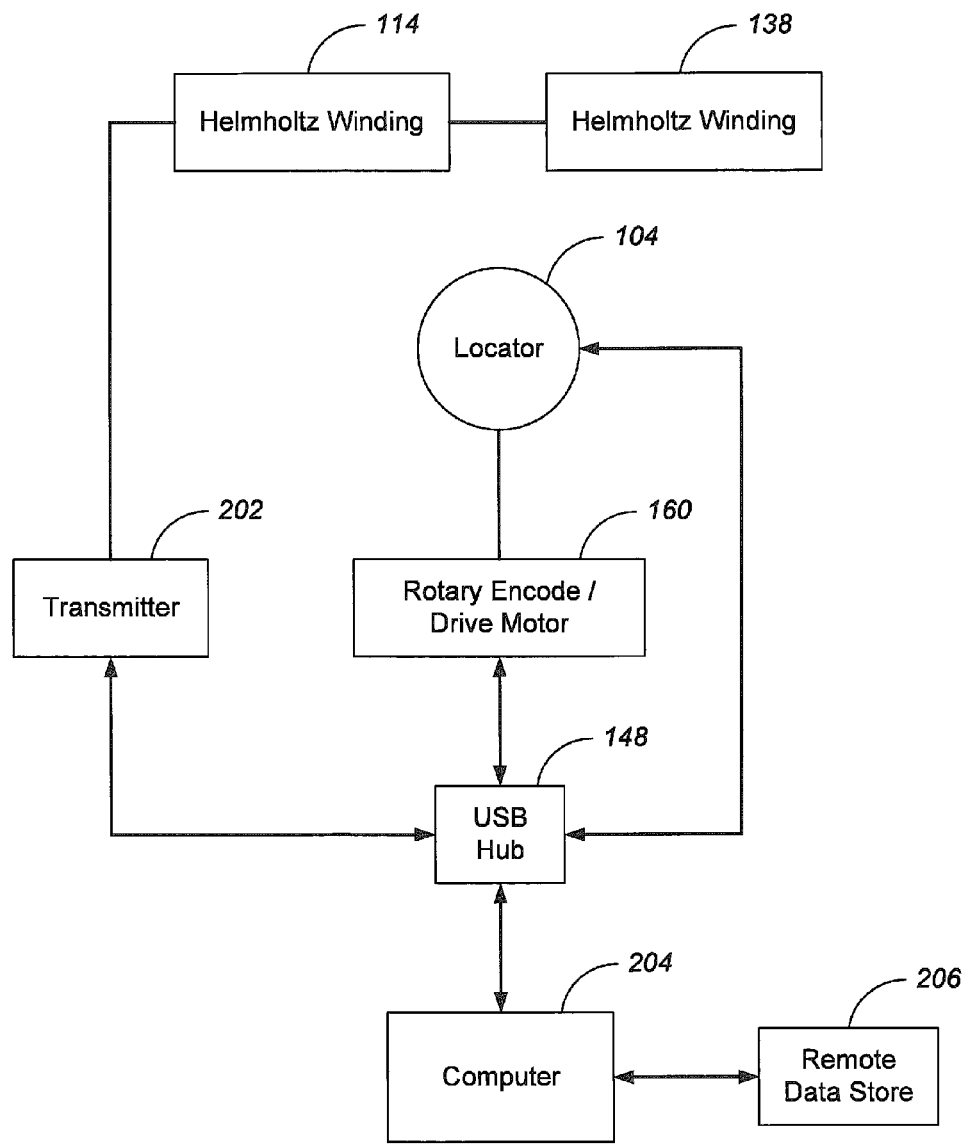
FIG. 2 is a block diagram of the system of FIG. 1A.

In FIG. 2, the locator 104 is illustrated as physically connected to the drive motor and rotary encoder assembly 160. A transmitter 202 is connected to the Helmholtz windings 114, 138. A computer 204 that is connected to the USB hub 148 can issue control data and receive data from the locator 104, transmitter 202, and drive motor and rotary encoder assembly 160. The computer 204 may communicate data to remote data store 206 through wired or wireless means.

Figure 3A:
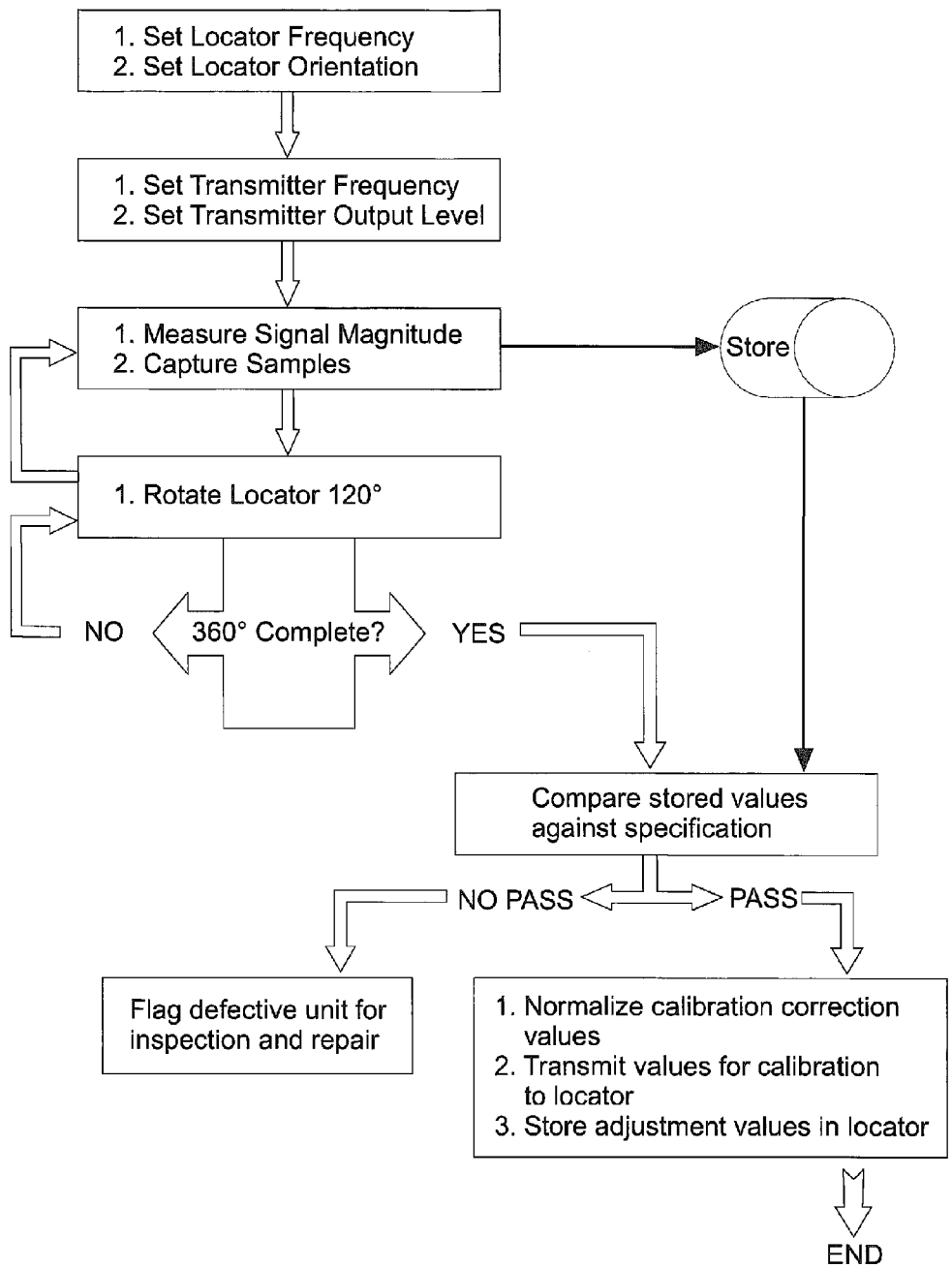
FIG. 3A is a logical flow chart illustrating the operation of the system of FIG. 1A.

FIG. 3A illustrates the logical steps in the operation of the system of FIGS. 1A-1D and FIG. 2 in calibrating the locator 104. As can be seen in the flow chart, an iterative loop is installed in the process by which signal data is captured at a series of rotary angles of the locator. In FIG. 3A, the emphasis is on sampling signal strength readings from all nodes, at a specific frequency and transmitter output in a series of steps separated by one hundred and twenty degrees of rotation. Calculated corrective values based on any discrepancies are returned and stored in the locator flash memory as part of the process, bringing about calibration of the instrument. Any angular increment step may be used. Finer rotation steps may be used. If the values exceed specification, the unit is passed to an inspection and repair process, to be re-calibrated when corrected.

Figure 3B:
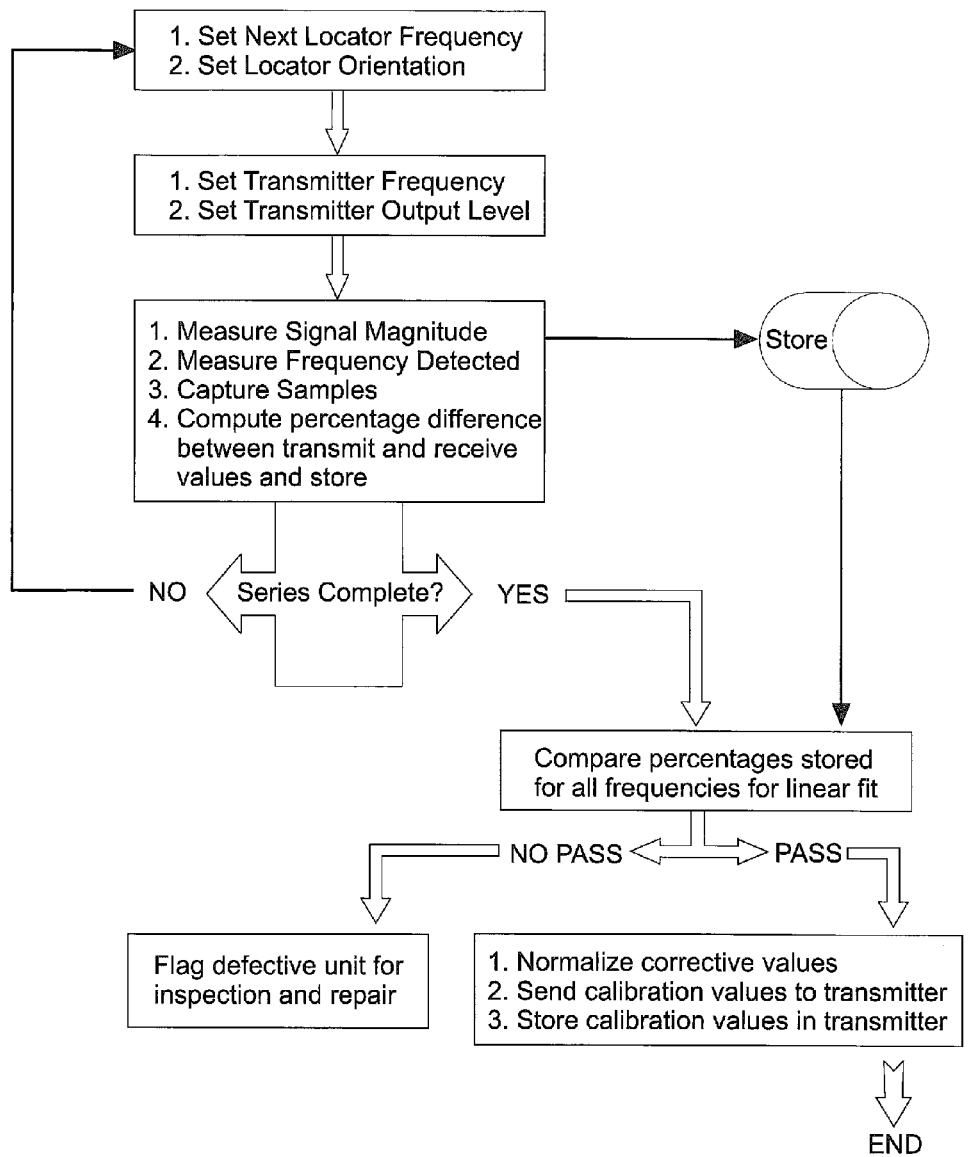
FIG. 3B is a logical flow chart illustrating the calibration of a transmitter.

FIG. 3B illustrates the logic flow of steps in the calibration of a transmitter. The test in FIG. 3B assumes a calibrated locator. A series of test steps at the standard output levels and frequencies is defined and the signal samples, as read at the locator are compared to specification values for an array of transmitter frequencies. The difference between the nominal frequency setting of the transmitter and the detected frequency at the locator, expressed as a percentage, is stored for each tested frequency. When the test series is complete, the values of difference are processed for a linear fit. Corrective values can be returned to and stored in the transmitter's software to effectuate calibration. If the values exceed manufacturer's specification, the transmitter is passed to an inspection and repair process, to be re-calibrated when corrected.

Figure 3C:
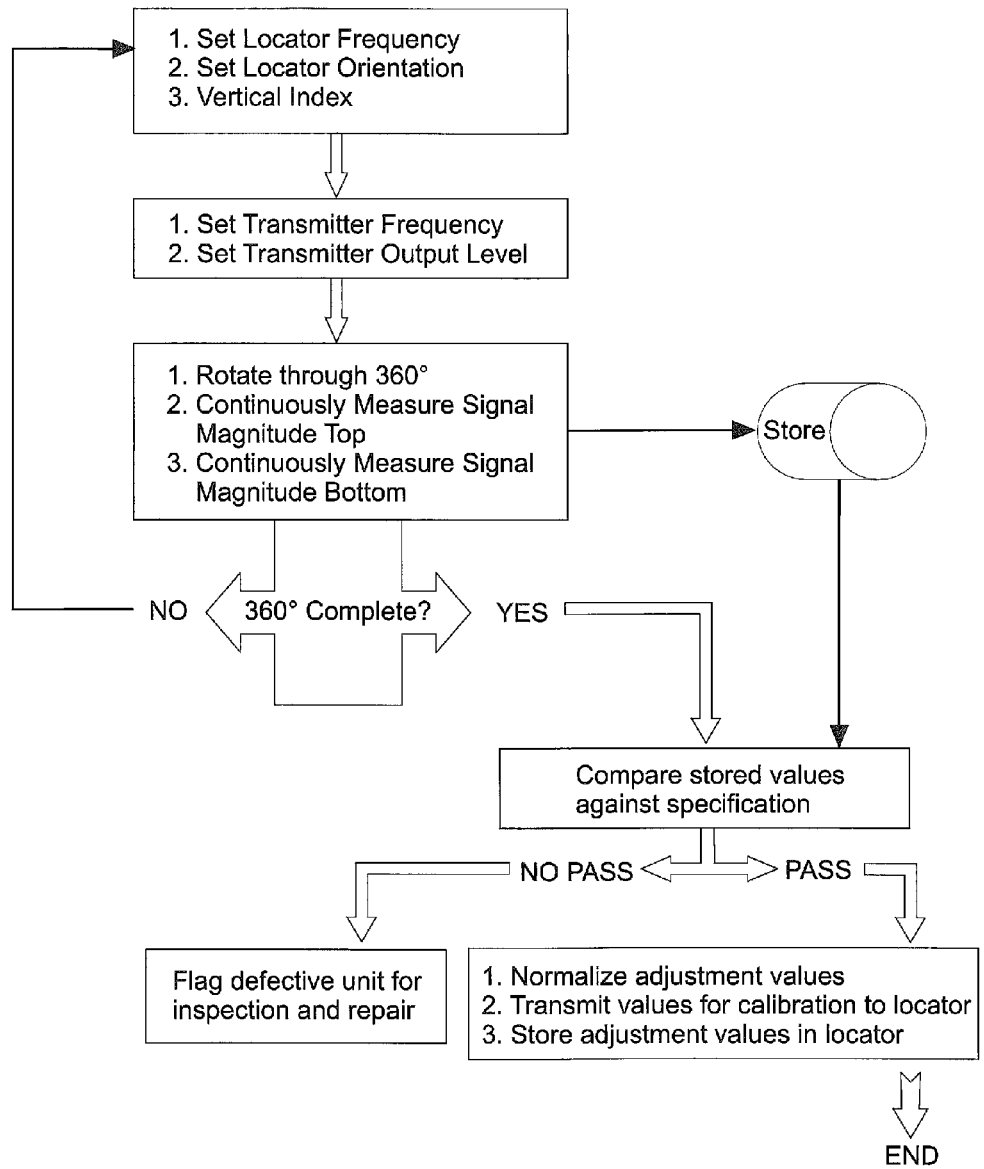
FIG. 3C is a logical flow chart illustrating the testing of a locator's depth reading in the system of FIG. 1A.

FIG. 3C illustrates testing a locator's depth reading. One locator with depth indication capability is disclosed in U.S. Pat. No. 7,332,901 granted Feb. 19, 2008, the entire disclosure of which is hereby incorporated by reference. A locator is set at a pre-determined location above the horizontal axis of the field generated by the calibration system, such that the lower and upper antenna nodes of the locator are not equidistant from the field's center. Continuous measurements of the top and bottom antenna-node detections are taken during a full rotation of the locator. Based on the degree of variance in computed depth readings, corrective values may be calculated and stored in software to effectuate calibrating the locator. A rapid field test of a locator may be similarly conducted simply by observing depth readings on the locator while rotating it using the present invention.

It will be understood by one versed in the art relating to this invention that modifications in configuration or components may be possible to achieve related results, and that additional applications of the present invention may be conceived of to test or calibrate devices not specifically identified herein or using variations in routines.

The design of the coil windings (114 in FIG. 1A) is not restricted in the present invention to a Helmholtz configuration. It will be clear to one versed in these arts that other winding configurations, such as, for example, a single circular, cylindrical, or an approximately prolate spheroidal coil design, could be used. One or more Helmholtz pairs, offset in space or rotated, could be used in alternative embodiments. A three-axis Helmholtz field could alternatively be used.

In an alternate embodiment, the locator mount 116 may be configured to accept different designs of locators and antennas without modification to the basic operation of the present invention. In another alternate embodiment, the present invention may be used to calibrate a compass unit which is part of a particular locator at the same time. The system may be used additionally in conjunction with one or more dipole sources or sondes for the purposes of calibration or testing at appropriate frequencies.

While we have described a preferred embodiment of our calibration system, modifications and variations thereof will occur to those skilled in the art. For example, the locator could be stationary and the Helmholtz windings could be moved around the locator.

Therefore, the protection afforded our invention should only be limited in accordance with the scope of the following claims.

We claim:

1. A calibration system for a portable locator, comprising:
a frame for supporting a locator;
a pair of coil windings mounted on the frame for generating a substantially symmetrical electromagnetic field surrounding the locator when supported on the frame when the coil windings are energized with a predetermined signal generated by a transmitter;
a drive assembly for rotating the locator; and
an interface that enables a computer to sample field strength signals from the locator at different rotational positions of the locator.

2. A calibration system for a portable locator, comprising:
a frame for supporting a locator;
a pair of coil windings mounted on the frame for generating a symmetrical electromagnetic field surrounding the locator when supported on the frame when the coil windings are energized with a predetermined signal generated by a transmitter;
a drive assembly for rotating the locator; and
an interface that enables a computer to sample field strength signals from the locator at different rotational positions of the locator;
wherein the system is configured so that the computer can control the rotation of the drive assembly and store position signals generated by the drive assembly corresponding to the sampled field strength signals.

3. The calibration system of claim 1 wherein the coil windings are substantially matched Helmholtz coils.

4. The calibration system of claim 3 wherein the coil windings are each made of a single turn of Copper tape.

5. The calibration system of claim 1 wherein the support for the locator includes a mount that receives an antenna node of the locator.

6. The calibration system of claim 5 wherein the mount that supports the antenna node is rotated by the drive assembly.

7. The calibration system of claim 1 wherein the frame is made of non-metallic parts.

8. The calibration system of claim 1 wherein the mount is connected to the frame by a coupling that permits a vertical position of the locator with respect to the frame to be adjusted.

9. The calibration system of claim 1 wherein the drive assembly includes a drive motor and a rotary encoder assembly.

10. The calibration system of claim 1 wherein the interface includes a USB hub.

11. A calibration system for a portable locator, comprising:
means for supporting a portable locator;
means for generating an electromagnetic field around the locator; and
means for enabling a plurality of field strength samples to be extracted from the locator representing different angular and/or vertical positional relationships of the locator and the electromagnetic field.

12. The calibration system of claim 11 wherein the field generating means includes a pair of matched Helmholtz coils.

13. The calibration system of claim 11 wherein the supporting means includes a mount that receives an antenna node of the locator.

14. The calibration system of claim 11 wherein the extracting means includes a computer interface.

15. The calibration system of claim 11 wherein the supporting means includes means mounted on the frame for rotating the locator.

16. The calibration system of claim 15 wherein the extracting means includes means connected to locator rotating means and the locator for sampling field strength signals from the locator at a plurality of different rotational positions of the locator relative to the electromagnetic field.

17. The calibration system of claim 11 wherein the supporting means includes means for raising and lowering the locator relative to the electromagnetic field.

18. The calibration system of claim 17 wherein the extracting means includes means for enabling field strength samples to be extracted from the locator at a plurality of different vertical positions of the locator relative to the electromagnetic field.

19. The calibration system of claim 11 and further comprising means connected to the extracting means for calculating corrective values and uploading the corrective values to the locator to thereby calibrate the locator.

20. A locator calibration system, comprising:

a frame that supports a portable locator;

at least one coil that generates an electromagnetic field around the locator when a suitable signal is applied to the coil;

a motor assembly capable of rotating the locator;

a sensor that outputs a signal representative of a rotational position of the locator relative to the magnetic field; and a computer interface that enables a computer to sample a plurality of field strength samples from the locator at each of a plurality of different rotational positions of the locator, calculate at least one corrective value, and upload the corrective value to the locator to calibrate the locator.

\* \* \* \* \*